United States Patent [19]

Tsuchiya et al.

[11] 4,034,406
[45] July 5, 1977

[54] FACSIMILE SIGNAL TRANSMISSION SYSTEM

[75] Inventors: Hiroyoshi Tsuchiya; Yukifumi Tsuda; Heijiro Hayami; Hiroaki Kotera, all of Kawasaki, Japan

[73] Assignee: Matsushita Electric Industrial Co., Ltd., Kadoma, Japan

[22] Filed: Nov. 20, 1974

[21] Appl. No.: 525,659

Related U.S. Application Data

[63] Continuation of Ser. No. 310,540, Nov. 29, 1972, abandoned.

[30] Foreign Application Priority Data

Nov. 29, 1971  Japan .............................. 46-96488

[52] U.S. Cl. ............................ 358/260; 358/261
[51] Int. Cl.² ..................... H04N 1/04; H04N 1/32; H04N 1/38
[58] Field of Search .......... 178/DIG. 3, 6; 358/260, 358/261

[56]  References Cited

UNITED STATES PATENTS 3,646,257   2/1972   Epstein .................................. 178/6

*Primary Examiner*—Robert L. Richardson
*Assistant Examiner*—Edward L. Coles

[57]  ABSTRACT

A two-valued object such as black-and-white textural or pictorial material is repeatedly scanned along each of a plurality of line paths within the object to produce an image signal which is representative of a series of black and white runs or areas within the line path. The length of black or white run or "run length" is sampled by clock pulses and translated into a binary code and transmitted bit by bit at the line scan rate to a receiver station. A vertical sync pulse is inserted at the end of the $(n-1)$th run length wherein $n$ represents the number of run lengths within the image signal so that the last run length is skipped. The last run length so skipped at the transmitter is reconstructed at the receiver during the time interval of the vertical sync pulse.

8 Claims, 67 Drawing Figures

Fig. 3

| RUN LENGTH (AREA ELEMENTS) | BINARY CODE | CODE LENGTH (BITS) |
|---|---|---|
| 1 | 1 0 | 2 |
| 2 | 1 1 | 2 |
| 3 | 0 1 0 | 3 |
| 4 | 0 1 1 | 3 |
| 5 | 0 0 1 0 0 | 5 |
| 6 | 0 0 1 0 1 | 5 |
| 7 | 0 0 1 1 0 | 5 |
| 8 | 0 0 1 1 1 | 5 |
| 9 | 0 0 0 1 0 0 0 | 7 |
| 10 | 0 0 0 1 0 0 1 | 7 |
| ⌇ | | ⋮ |
| 15 | 0 0 0 1 1 1 0 | 7 |
| 16 | 0 0 0 1 1 1 1 | 7 |
| 17 | 0 0 0 0 1 0 0 0 0 | 9 |
| 18 | 0 0 0 0 1 0 0 0 1 | 9 |
| ⌇ | ⌇ | ⋮ |
| 31 | 0 0 0 0 1 1 1 1 0 | 9 |
| 32 | 0 0 0 0 1 1 1 1 1 | 9 |
| 33 | 0 0 0 0 0 1 0 0 0 0 0 | 11 |
| 34 | 0 0 0 0 0 1 0 0 0 0 1 | 11 |
| ⌇ | ⌇ | ⋮ |
| 63 | 0 0 0 0 0 1 1 1 1 1 0 | 11 |
| 64 | 0 0 0 0 0 1 1 1 1 1 1 | 11 |
| 65 | 0 0 0 0 0 0 1 0 0 0 0 0 0 | 13 |
| 66 | 0 0 0 0 0 0 1 0 0 0 0 0 1 | 13 |
| ⌇ | ⌇ | ⋮ |
| 127 | 0 0 0 0 0 0 1 1 1 1 1 1 0 | 13 |
| 128 | 0 0 0 0 0 0 1 1 1 1 1 1 1 | 13 |
| 129 | 0 0 0 0 0 0 0 1 0 0 0 0 0 0 0 | 15 |

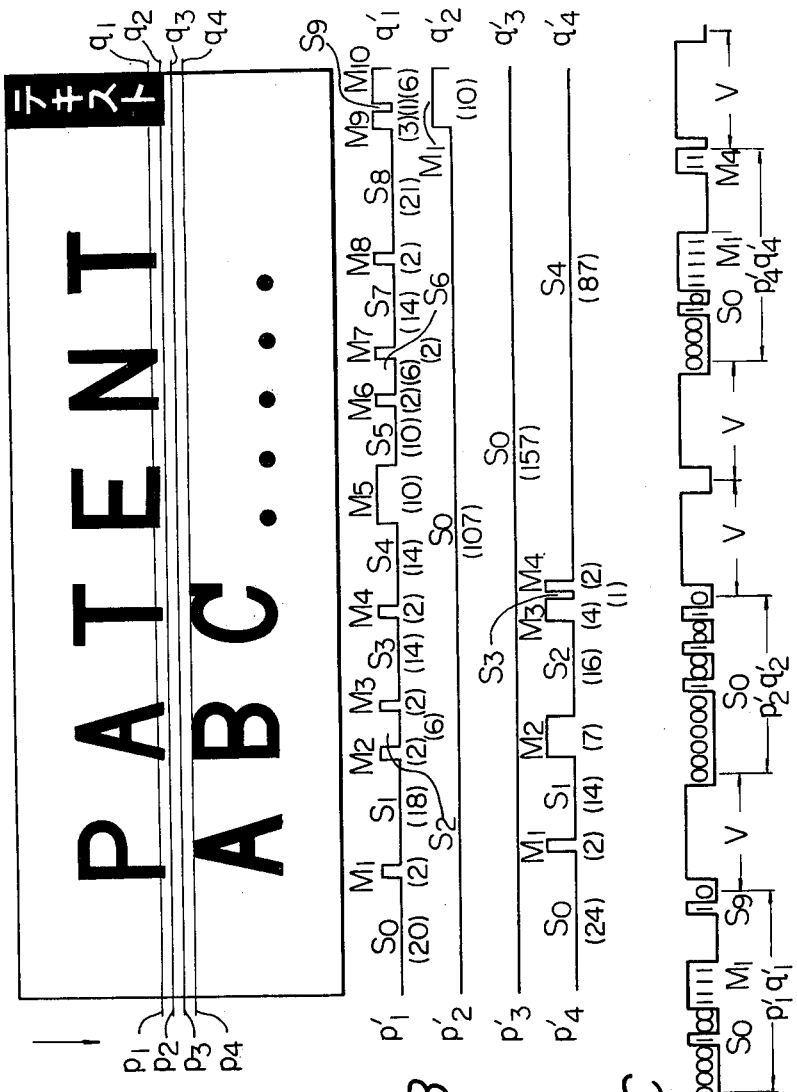

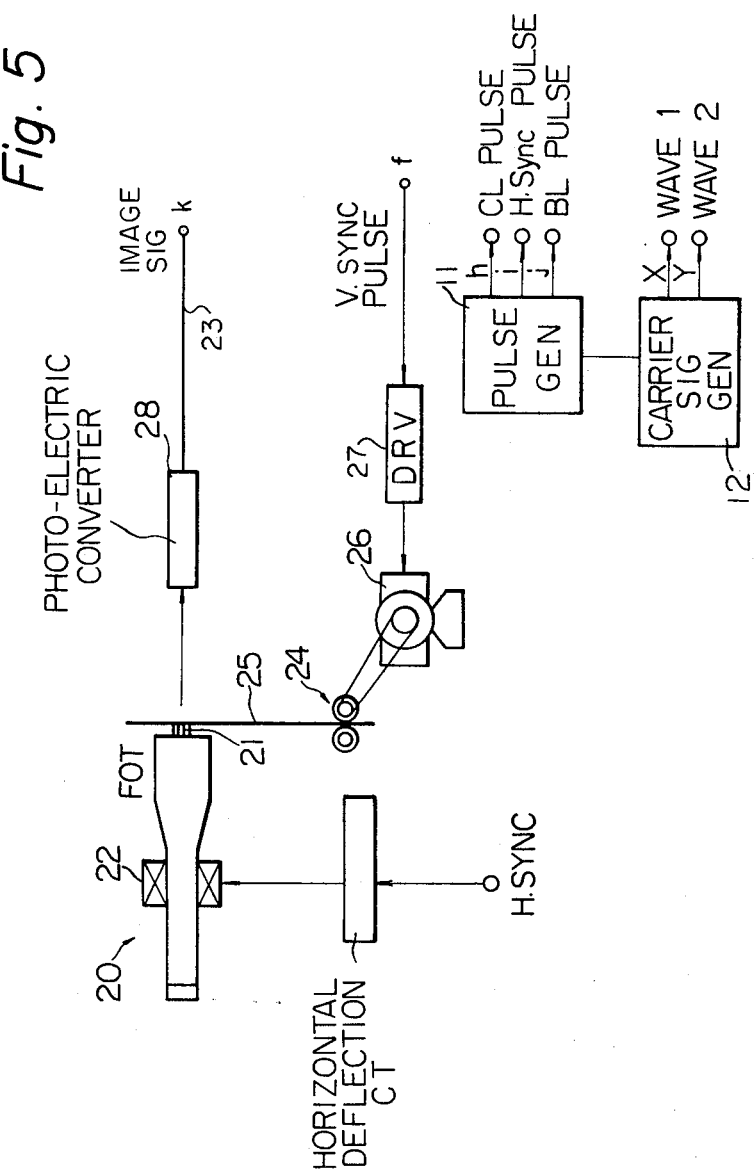

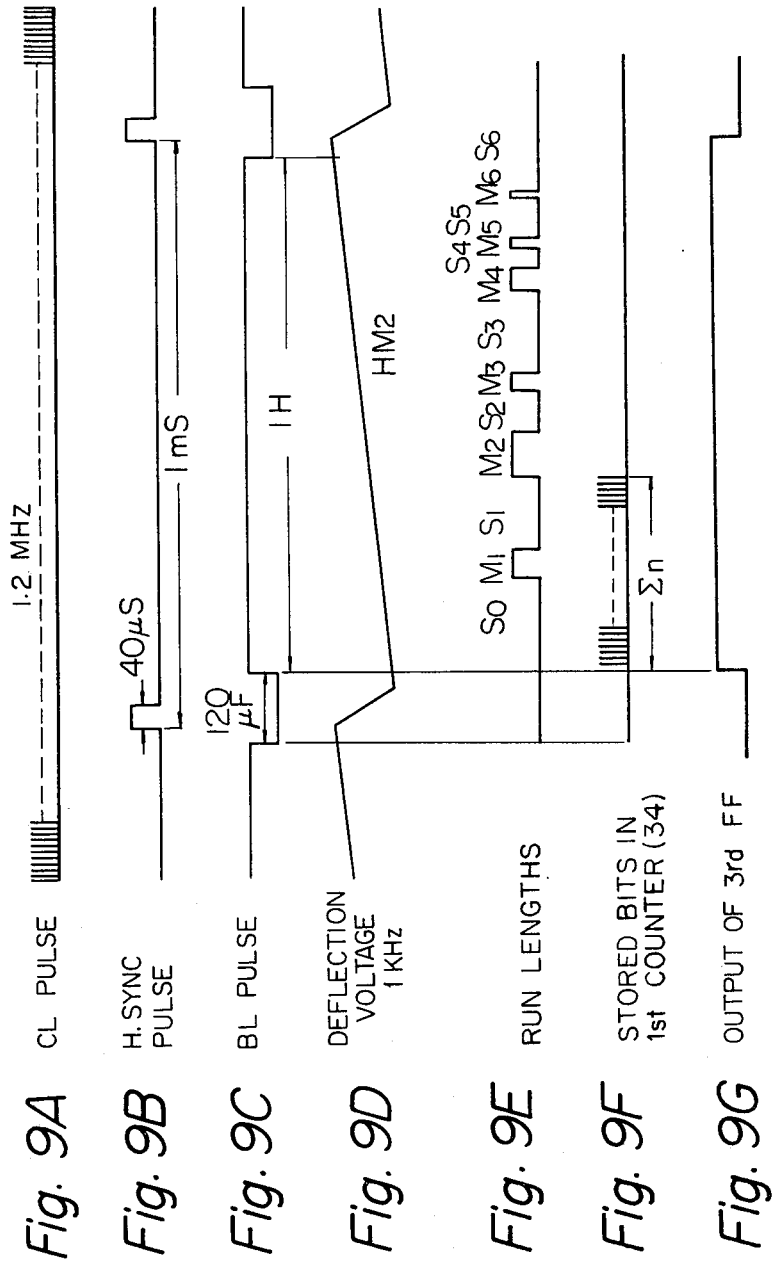

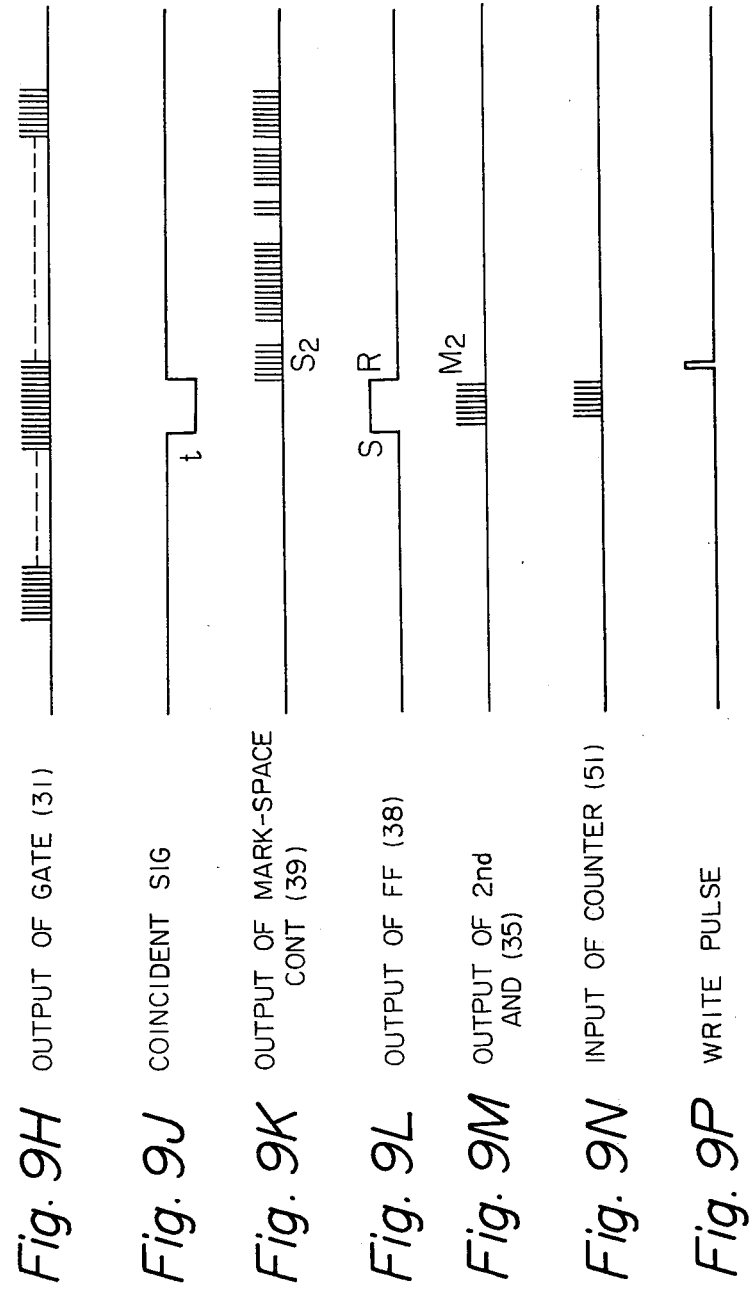

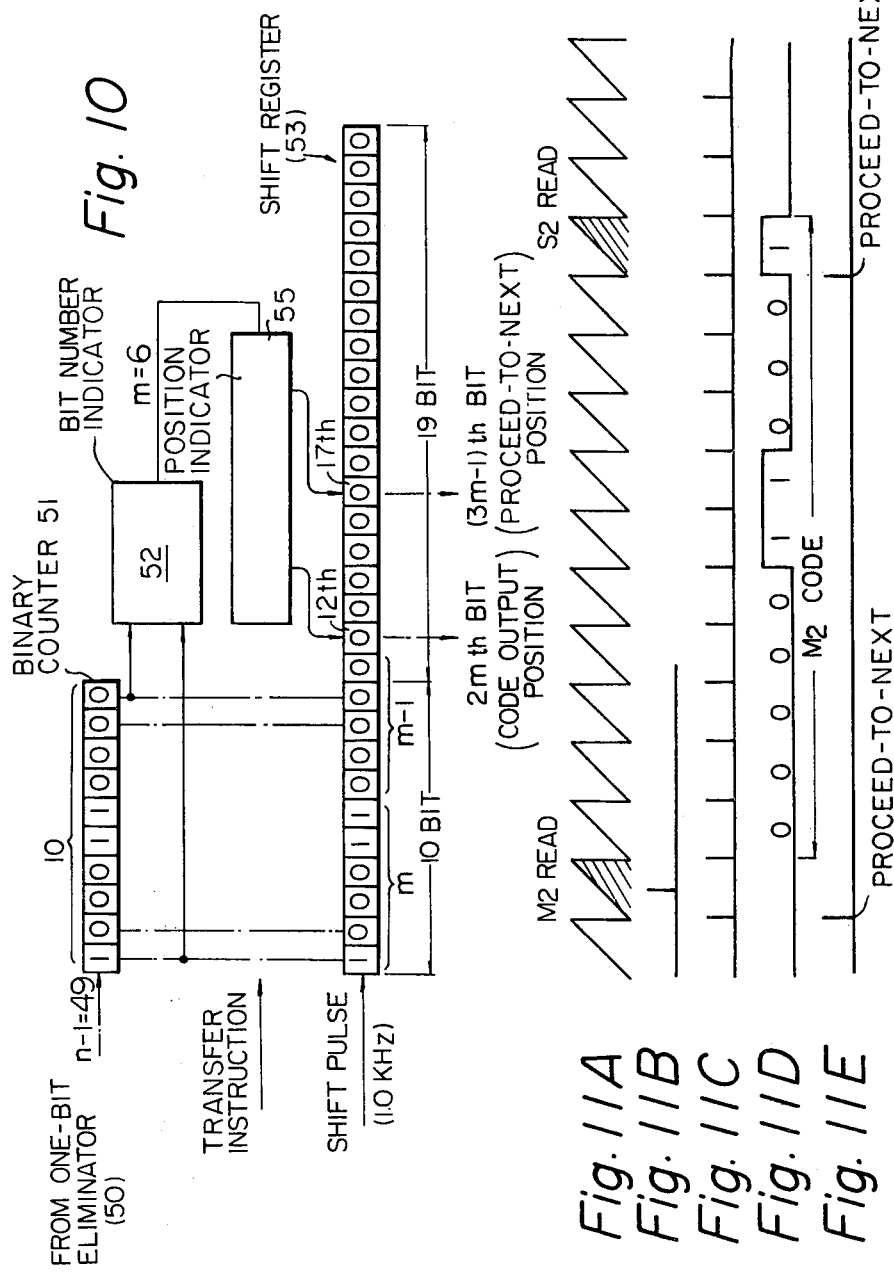

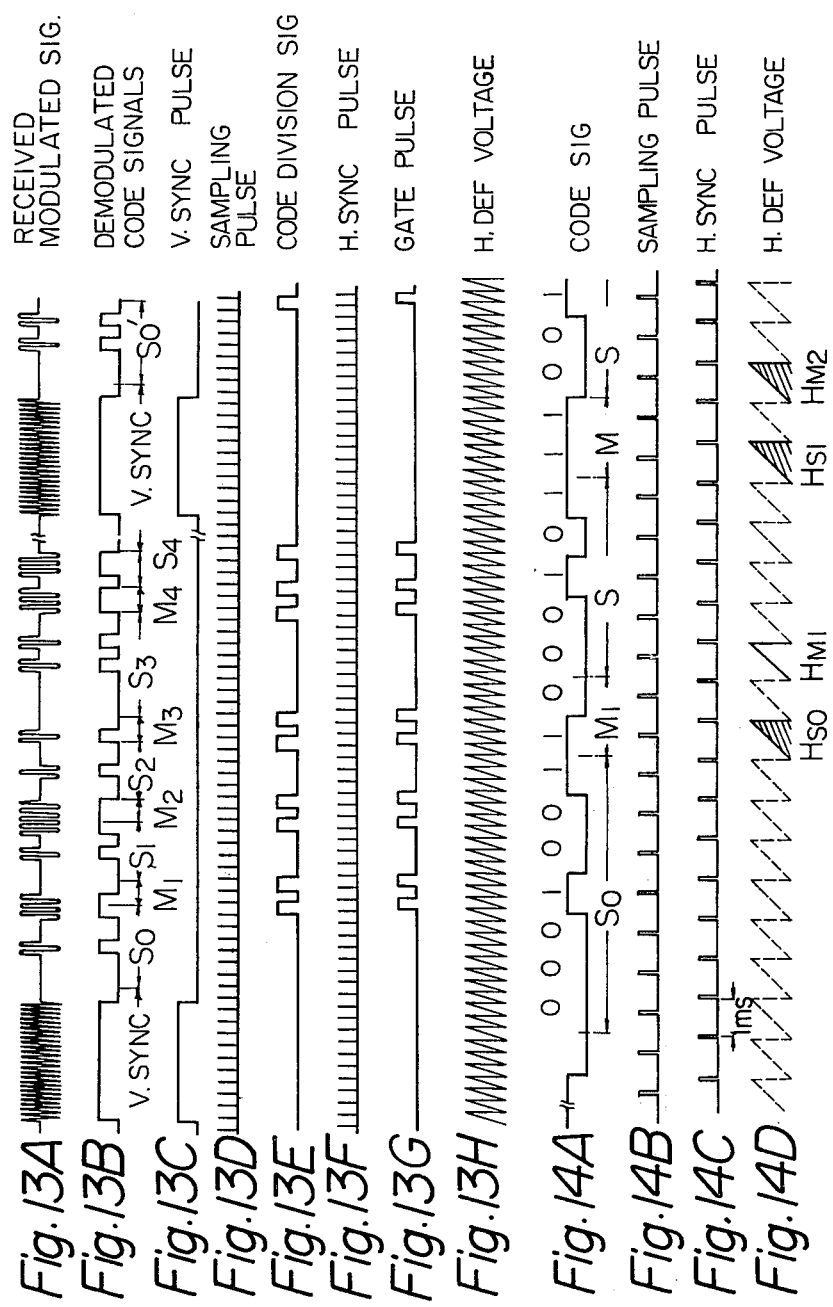

FACSIMILE SIGNAL TRANSMISSION SYSTEM

This is a continuation of application Ser. No. 310,540, filed Nov. 29, 1972, now abandoned.

The present invention relates generally to facsimile communications, and more particularly to a reduced-time transmission system wherein large areas of black or white are scanned and transmitted with a "length-of-run" code.

It is well known that most forms of black and white textual or pictorial material is highly redundant. That is, the regions of different brightness or shade tend to be clustered in groups quite large compared to the areas of individual picture elements or resolution dots that together comprise the picture. The signals associated with the material are, therefore, not random but exhibit a considerable degree of correlation. This correlation, which may be spatial or temporal, has been explored in the past and it has been determined that a communication system employing a channel capacity sufficient to accommodate a completely random comparison signal is inefficient so far as the actual signals are correlated. Consequently, it becomes desirable to encode the signals in such a way that a substantial portion of the redundancy is removed.

In order to transmit facsimile signals in a reduced transmission time, run length coding has been developed wherein typewritten text or pictorial material to be transmitted by facsimile is encoded in terms of black and white lengths found along the customary narrow parallel scanning line paths extending across the copy. The lengths of successive black and white "runs" along a scanning line are measured and encoded for binary digital transmission according to a predetermined rule.

Transmission of encoded facsimile signals involves, at the receiving end of a channel, identification of particular code from the consecutive sequence of bits for decoding purposes. To facilitate efficient decoding of the facsimile signals, French Pat. No. 2,106,560 issued to the same assignee as the present invention describes provision of additional bits of information to indicate the number of bits contained in a single encoded signal representing a run length. Consequently, each of the encoded facsimile signals contains higher bits in the form of a series of 0 bits to indicate the number of bits to follow and lower bits representing a run length.

In accordance with the present invention, it is contemplated that repeated scanning along a line path and successive encoding of run lengths results in a further reduction in the transmission time if the last run length of each line path is not transmitted and reconstructed at the receiver station during the internal of a vertical sync pulse. This is particularly advantageous if the textual material contains a plurality of sequential line paths of all white areas, and the transmitter is to transmit only a series of vertical sync pulses associated with the line paths.

An object of the present invention is therefore to provide a bandwidth-time compressed facsimile system.

Another object of the invention is to skip the last run length of each line path at the transmitter station and to reconstruct it at a receiver station within the interval of a vertical synchronizing pulse.

Other and many of the attendant advantages of the present invention will become readily apparent to those skilled in the art as an understanding thereof is obtained by reference to the following description when considered in connection with the accompanying drawings, in which:

FIG. 3 is a chart showing the run length code, each code having higher 0 bits representing the number of bits to follow and lower bits representing a run length, except for runs of 1 and 2.

FIG. 4A is a black and white textual material to be transmitted by facsimile

FIG. 4B is a diagram showing run lengths representative of black and white areas of the scanned line paths within the textual material of FIG. 4A.

FIG. 4C is a diagram showing a train of encoded form of the image signals of FIG. 4B with the last or only one run length in each of the line paths being skipped for time compression in accordance with the invention.

FIGS. 5 and 6 are circuit block diagrams of a transmitter of a facsimile system of the invention.

FIGS. 9A through 9P are diagrams showing waveforms of signals appearing in the transmitter of FIGS. 5 and 6.

FIG. 10 is a schematic diagram showing coding operation of the transmitter of FIG. 6 in accordance with the coding system shown in FIG. 3.

FIG. 11A shows a line sweep signal wherein encoding or reading is effected during the shadowed portions.

FIG. 11B shows read-out pulses to start coding of run lengths.

FIG. 11C shows a train of shift pulses used to cause the data bits stored in a shift register of FIG. 10 to be shifted one stage along the register.

FIG. 11D shows an encoded signal derived upon occurrence of one of the read-out pulses of FIG. 11B.

FIG. 11E shows transmission completion pulses indicating the end of transmission of preceding codes.

Figure 12A:
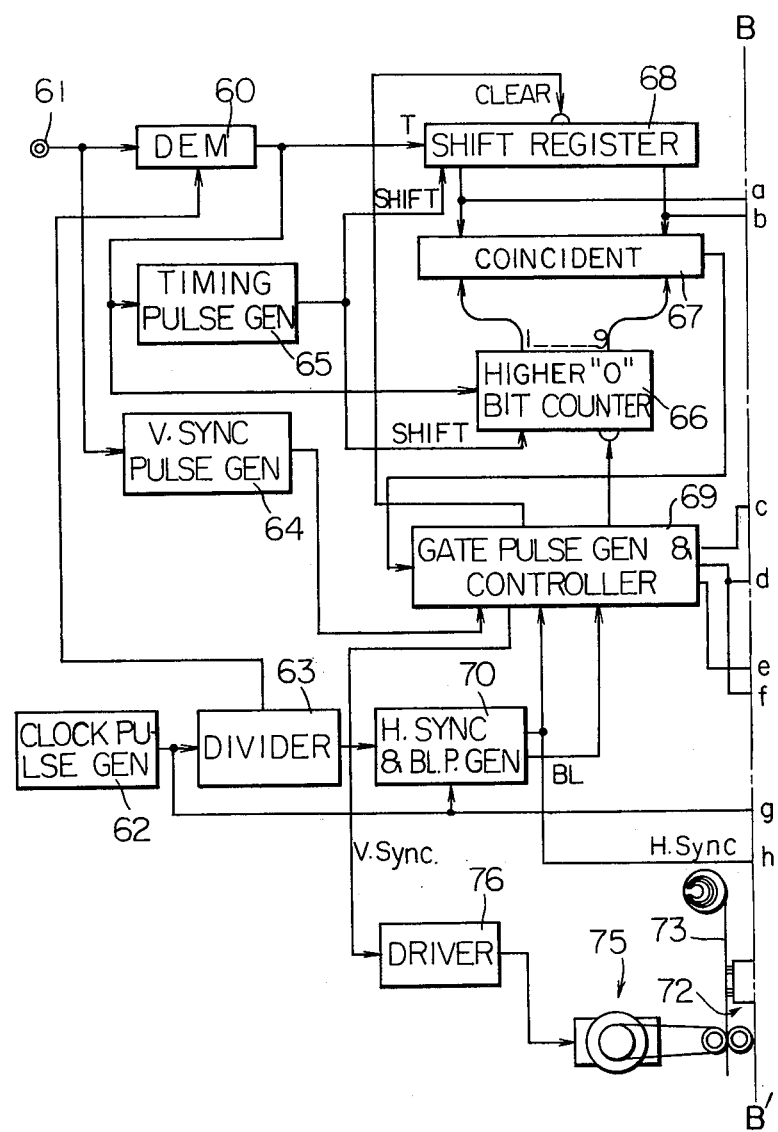
FIG. 12 is a schematic block diagram showing a facsimile receiver according to the invention.
Figure 12:
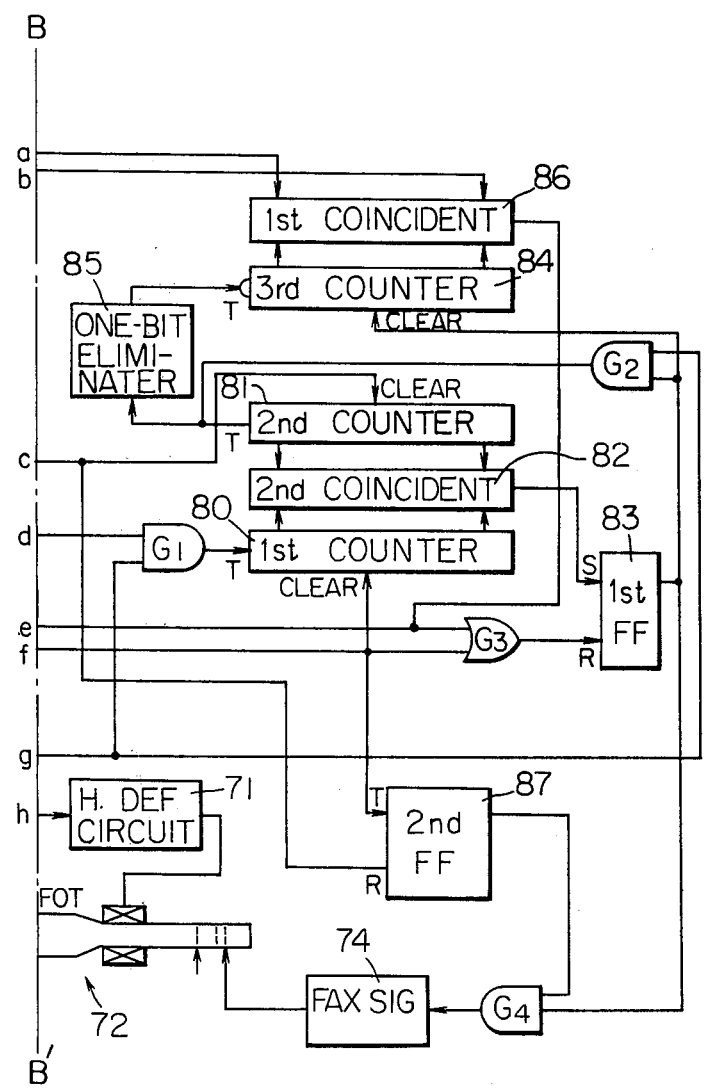

FIGS. 13A through 13M, and 14A through 14D show timing relations of various signals appearing in the receiver of FIG. 12.

Figure 15A:
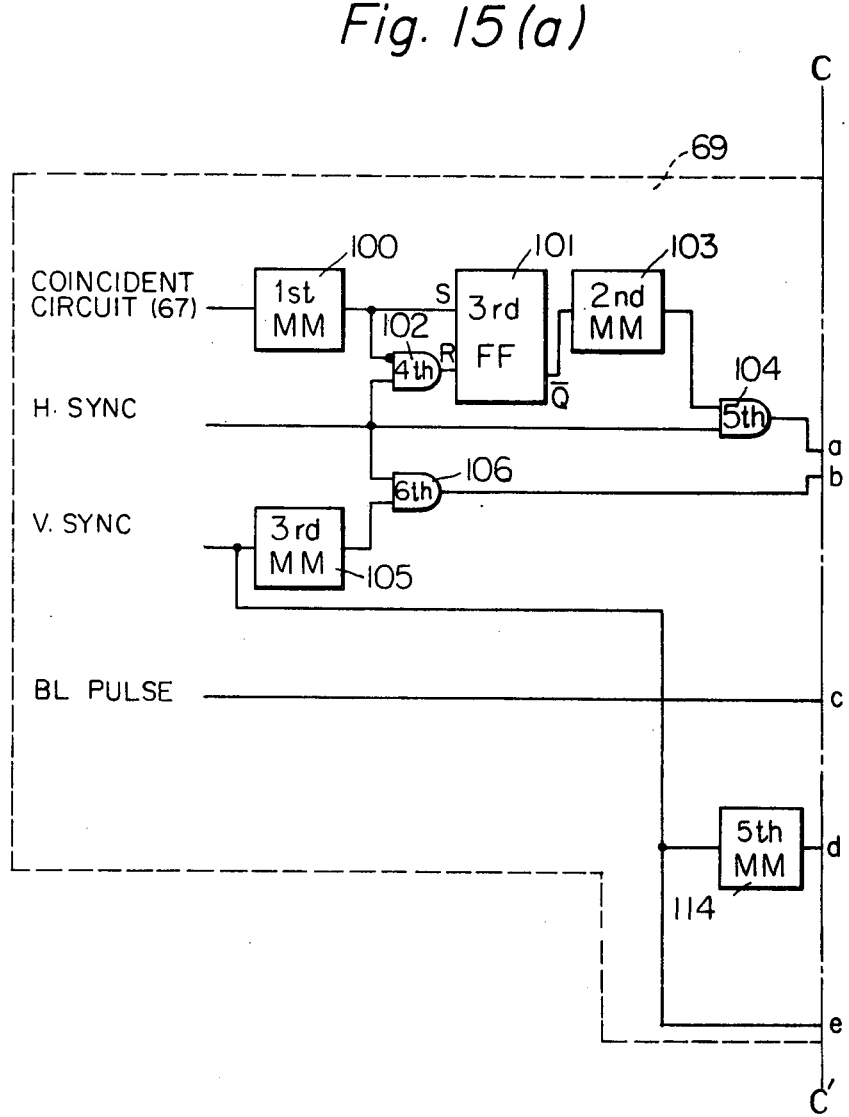
Figure 15:
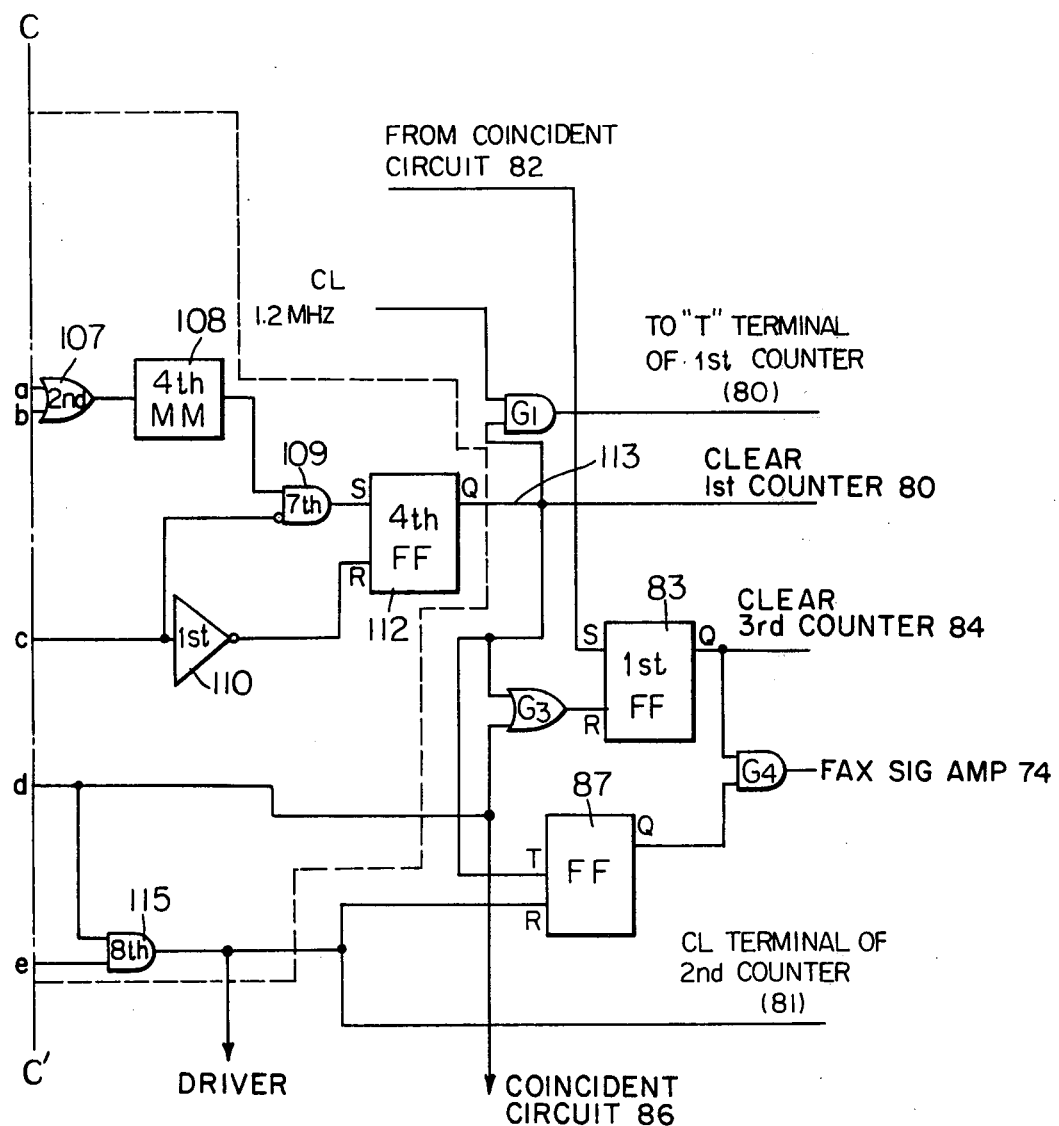

FIG. 15 is a circuit diagram of a gate pulse generator controller of the facsimile receiver of FIG. 12.

FIGS. 16A to 16P show timing diagrams of various signals and the operation of circuit elements of FIG. 15.

Figure 17:
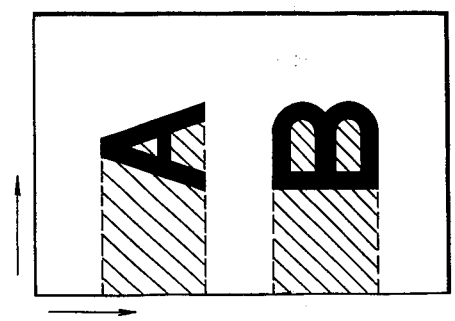
Figure 18D:
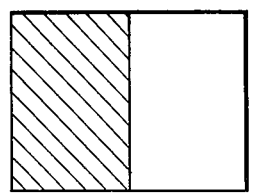
Figure 18C:
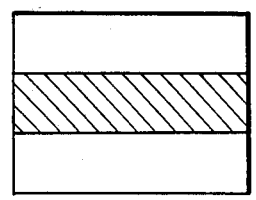
Figure 18B:
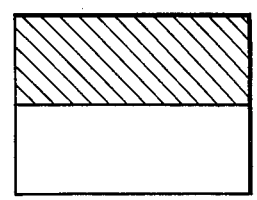
Figure 18A:
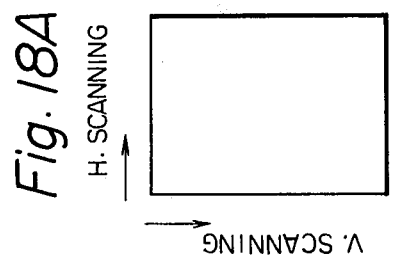

FIG. 17 is a view showing an example of information medium.

FIGS. 18A through 18D are views diagrammatically showing examples of information medium.

Figure 1:
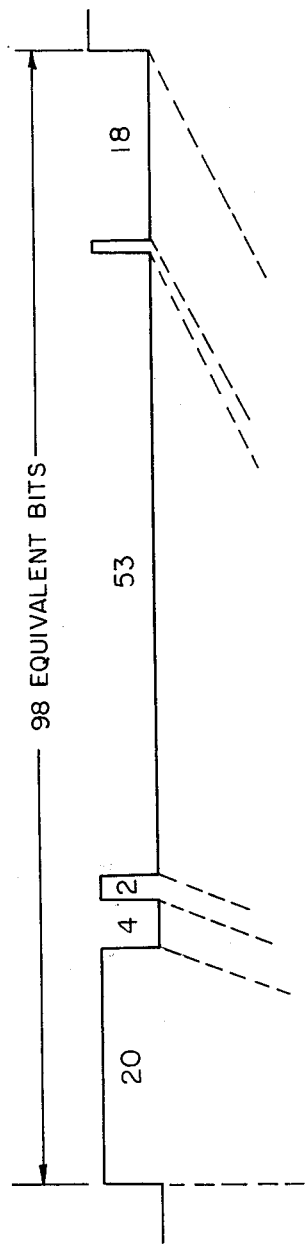
FIG. 1 is a diagram showing a waveform of an image signal derived from scanning of a black and white textual material along a line path.

Referring now to the drawings and more specifically to FIG. 1 thereof, there is illustrated a waveform of a facsimile signal of an image signal derived from scanning a single line path within a two-valued object such as a black and white textual or pictorial material with a conventional scanning means.

The image signal is representative of the light levels of the two-valued object and comprises a consecutive sequence of black and white levels or "run lengths".

Figure 2:
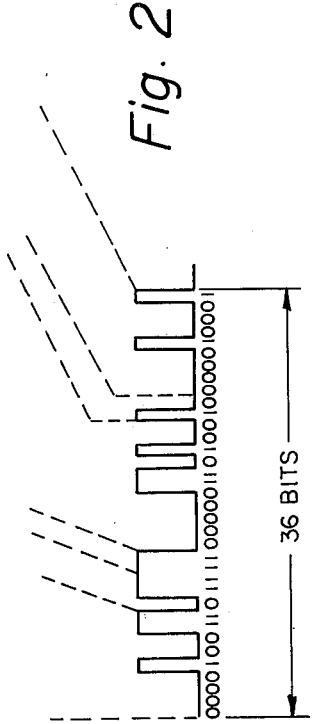
FIG. 2 is a diagram showing successive binary code signals representing run lengths of the image signal of FIG. 1 to indicate how time compression is effected by coding the run lengths into binary form.

As will be described later, each of the run lengths is encoded into binary form as shown in FIG. 2 in accordance with the coding system of the invention shown in FIG. 3 so that the total length of the image signal is reduced in time to 36 bits of information from 98 equivalent bits or area elements.

In order to understand the coding procedure which is employed, reference is made to the chart in FIG. 3 which shows how the run-length code is generated. A run of three is identified by the code word 010 wherein the leftmost 0 bit is used to indicate the number of bits which follow and the subsequent 2 bits indicates the run length. Likewise, a run of 5 includes two preceding 0 bits and a subsequent group of three bits indicating the run length. For runs of three or more, the preceding group of 0 bits or higher bits is used to indicate the number of bits to follow minus one and the subsequent bits or lower bits represent in binary number system the length of each run. This minimizes the number of bits required for the receiving end of the facsimile system to identify each of the incoming code words. For runs of one and two, special coding is employed. The preceding "1" bits indicates that a received signal is a run of one or two and the subsequent bits identify them. It is to be appreciated that although the number of higher bits which represent the number of subsequent bits minus one is the minimum number it is apparent that the number of higher bits may be any number so far as the predetermined fixed relation exists between the higher and lower bits. As seen from the chart of FIG. 3, run of 5 is represented by the lower bits 100 which is obtained by subtracting 1 from 5 and translating the subtracted number (4) in accordance with the binary number system. This reduces the total number of bits used in transmission compared with direct translation of the decimal number into a binary number. The allotment of code words "10" and "11" to runs of 1 and 2 thus permits minimization of the number of lower bits used in representing the decimal run length number. To this end, the decimal number is subtracted one before it is translated into binary form.

When textual or pictorial material as shown in FIG. 4A is scanned along lines $p_1 9_1, p_2 q_2, p_3 q_3$ and $p_4 q_4$, facsimile signals $p_1' q_1', p_2' q_2', p_3' q_3',$ and $p_4' q_4'$ are produced in the transmitter, which facsimile signals consist of space signals $S_0, S_1, S_2, \ldots$ and mark signals $M_1, M_2, M_3, \ldots$ respectively having run-length indicated by parenthesized numerals. The facsimile signals are then converted into successive binary code signals as shown in FIG. 4C, wherein pulses V are vertical synchronizing pulses separating the binary code signals each corresponding to an image signal derived as a result of scanning each of a plurality of line paths within the two-valued object material.

Figure 6A:
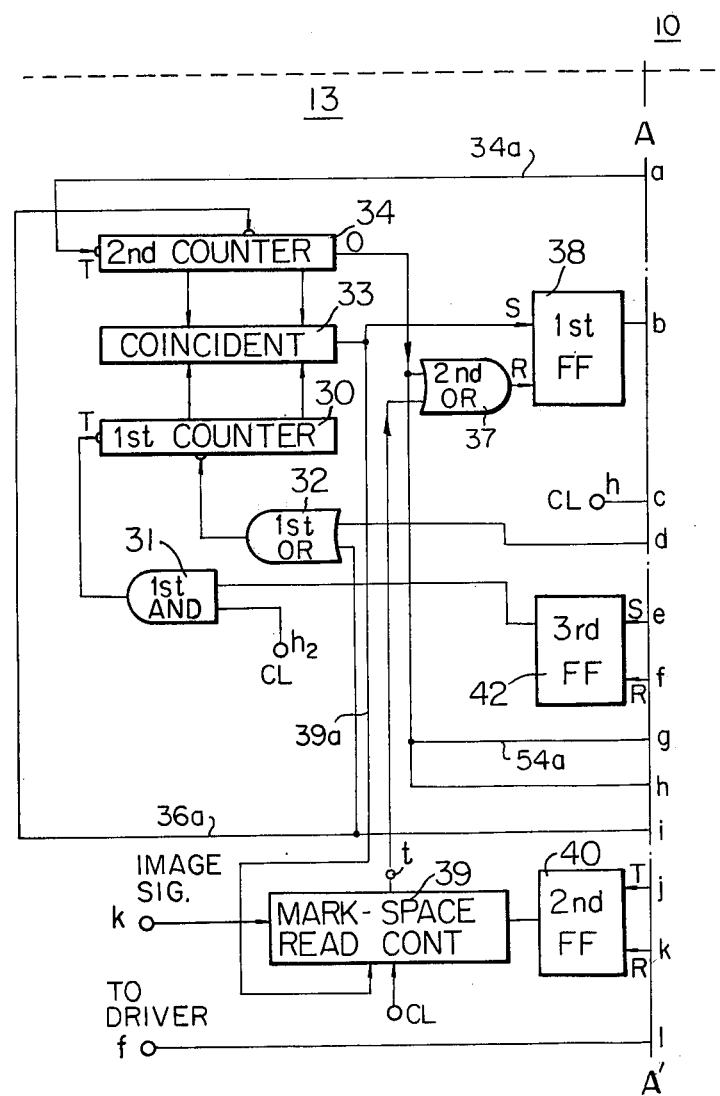
Figure 6:
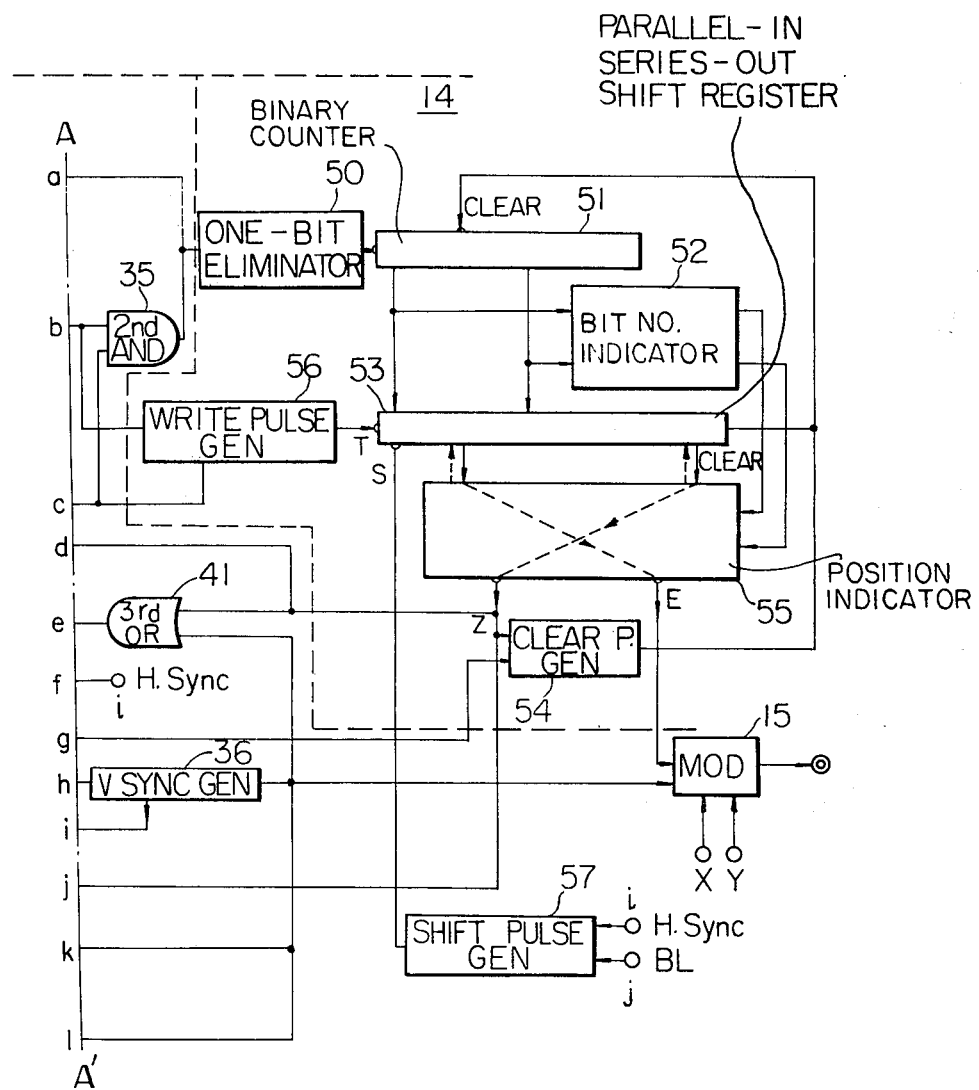

In FIGS. 5 and 6, there is shown a transmitter of a facsimile system according to the invention, which generally comprises a facsimile transmitter 10, a pulse generator 11 for producing clock pulses, horizontal synchronizing pulses and blanking pulses, a carrier wave generator 12 for producing carrier waves, a sampler 13 for sampling the image signal with clock pulses, a coder 14 for coding the sampled image signal into successive binary code signals, and a modulator 15 for modulating a carrier wave with the binary code signals. The facsimile transmitter 10 includes a fibre optics cathode-ray tube 20 having a fibre optics faceplate 21 and a horizontal deflection element 22. A horizontal deflection circuit 23 produces a horizontal deflection signal in accordance with a horizontal synchronizing pulse from the pulse generator 11. A feed means 24 such as a pair of rollers feeds a copy 25 carrying thereon image information to be picked up in close proximity to the fibre optics faceplate 21. The feed means 24 is actuated by a prime mover 26 such as an electric pulse motor which is driven by a driver 27 when the driver 27 is energized by a vertical synchronizing pulse signal generated in the sampler 13. A photo-electric converter 28 is positioned in the vicinity of the fibre optics faceplate 21, the converter 28 converts the intensity modulated light into an electric signal, that is, an image signal.

The sampler 13 includes a first binary counter 30 having a trigger input terminal connected to an output of a first AND gate 31 and a clear input terminal connected to an output of a first OR gate 32. Output terminals of the first binary counter 30 are connected to first group input terminals of a coincident circuit 33. The coincident circuit 33 further has second group input terminals connected to output terminals of a second binary counter 34 which has its trigger input terminal corrected on lead 34a to an output of a second AND gate 35, and its clear input terminal connected to an output terminal of a vertical synchronizing pulse signal generator 36. The second binary counter 34 has an overflow output terminal (O) through which an overflow signal is produced when the second binary counter 34 overflows. The overflow output terminal is connected to one input of a second OR gate 37 and an input terminal of the vertical synchronizing pulse signal generator 36. The coincident circuit 33 is adapted to produce a coincident signal on an output terminal thereof connected to the set terminal of a first flip-flop circuit 38 and to the input terminal of a mark-space signal controller 39. The first flip-flop circuit 38 has its reset terminal connected to an output of the second OR gate 37 and its output terminal connected to one input of the second AND gate 35. The other input of the second AND gate d35 is connected to a clock pulse terminal ($h_1$) of the pulse generator 11. The other input of the second OR gate 37 is connected to an output terminal of the mark-space signal controller 39 which has three other input terminals respectively connected to the photoelectric converter 28, the clock pulse terminal of the pulse generator 11 and an output terminal of a second flip-flop circuit 40. A reset terminal of the second flip-flop circuit 40 is connected to an output terminal of the vertical synchronizing pulse generator 36. The output terminal of the generator 36 is further connected to an input terminal of the driver 27 and to one input of a third OR gate 41 which has an output connected to a set terminal of a third flip-flop circuit 42. A reset terminal of the third flip-flop circuit 42 is connected to a horizontal synchronizing pulse terminal (i) of the pulse generator 11. The output terminal of the flip-flop circuit 42 is connected to one input of the first AND gate 31 the other input of which is connected to the clock pulse terminal ($h_2$) of the pulse generator 11. One input of the first OR gate 32 is connected to the output terminal of the vertical synchronizing pulse generator 36.

The coder 14 includes an 1-bit delete circuit 50 having an input terminal connected to the output of the second AND gate 35 to eliminate the first bit of a series of pulses supplied therefrom. The output terminal of the 1-bit delete circuit 50 is connected to an input terminal of a binary counter 51 having its output terminals connected to input terminals of a bit number indicator 52 and a parallel-to-series shift register 53. A clear input terminal of the binary counter 51 is connected to an output terminal of a clear pulse generator 54. Output terminals of the bit number indicator 52 are connected to input terminals of a position indicator 55. The parallel-to-series shift register 53 has its trigger input terminal connected to a write pulse generator 56 and its clear input terminal connected to the output terminal of the clear pulse generator 54. The write pulse generator 56 instructs the shift register 53 to transfer thereto the stored bits from binary counter 51 and has input terminals respectively connected to the output terminal of the first flip-flop circuit 38 and to the clock pulse terminals $h_1$ of the pulse generator 11. Output terminals of the shift register 53 are connected to input terminals of the position indicator 55 which has its proceed-to-next terminal Z connected to one input terminal of the clear pulse generator 54 and to input terminals of the first and second OR gates 32 and 41 of the sampler 13. The proceed-to-next terminal of the position indicator 55 is further connected to a trigger terminal of the second flip-flop circuit 40 of the sampler 13. The other input terminal of the clear pulse generator 54 is connected to the overflow terminal of the binary counter 34 of the sampler 13. The shift register 53 has its clear input terminal connected to the output terminal of the clear pulse generator 54 and its shift pulse input terminal S connected to an output terminal of a shift pulse generator 57 which has input terminals connected to the horizontal synchronizing pulse terminal and a blanking pulse terminal of the pulse generator 11.

The modulator 15 has its input terminal connected to a signal extraction terminal E of the position indicator 55 and another input terminal connected to the output terminal of the vertical synchronizing pulse generator 36. The modulator further has its input terminals connected to output terminals of the carrier signal generator 12. An output terminal of the modulator 15 is to be connected to a suitable transmission channel (not shown).

With reference to FIGS. 7A through 7E, and FIGS. 8A through 8D, the operation of the transmitter of FIGS. 5 and 6 will be explained hereinbelow.

Figures 7A, 7B, 7C, 7D, 7E, 8A, 8B, 8C, 8D:
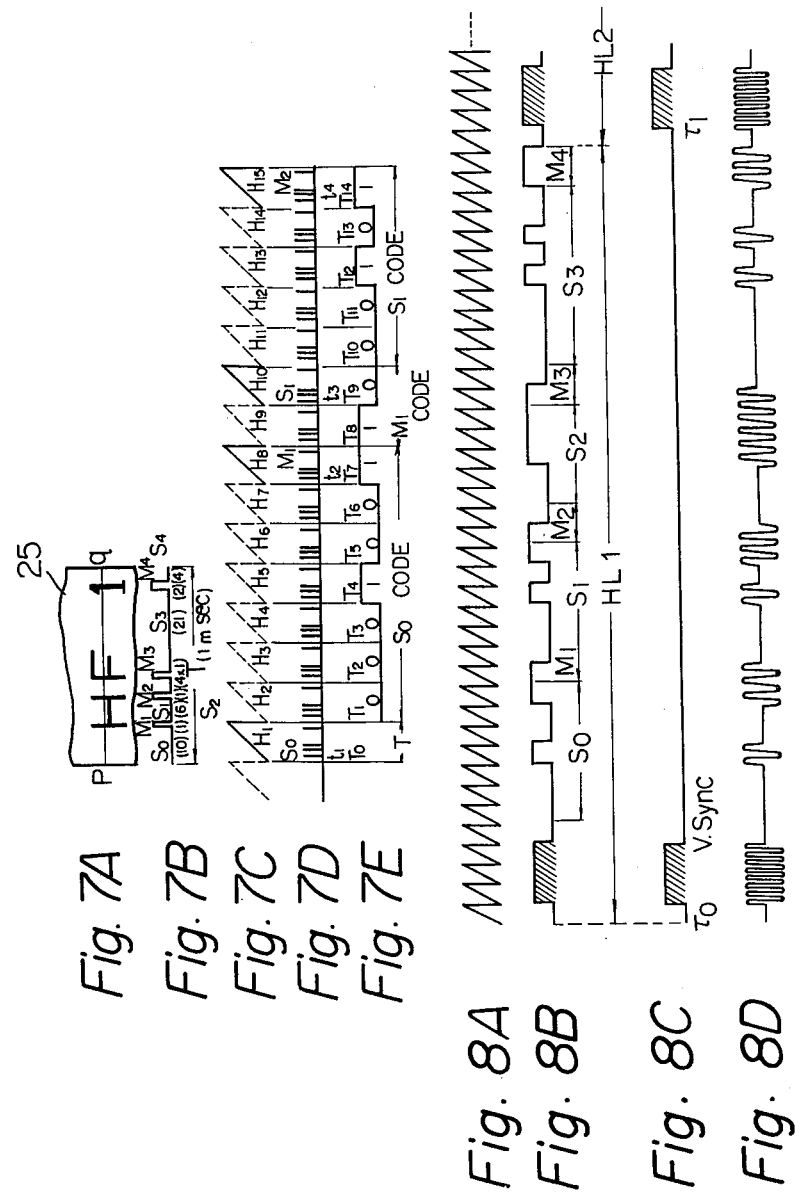
FIG. 7A is a black and white textual material to be scanned along a line p–q, useful for explanation of encoding the run length derived from the scanning.
FIG. 7B is an image signal produced by scanning the line p–q of FIG. 7A.
FIG. 7C shows a sawtooth waves used to repeatedly scan the text of FIG. 7A wherein encoding is effected during solid line part of the waves and signal transmission is effected during broken lines part thereof.
FIG. 7D shows image signals repeatedly produced by the sawtooth waves of FIG. 7C.
FIG. 7E shows encoded signals representative of the run lengths of FIG. 7B.
FIGS. 8A through 8D are timing diagrams showing relations between line sweep signals, bits of encoded signals, vertical synchronizing pulses and modulated encoded signals.

In FIG. 7A, copy 25 is shown being scanned along line p–q; an image signal as shown in FIGS. 7B will be generated. As shown, the image signal consists of space signals $S_0$, $S_1$, $S_2$, $S_3$ and $S_4$, and mark signals $M_1$, $M_2$, $M_3$ and $M_4$. Run-lengths of the space and mark signals are indicated by parenthesized numerals. When a horizontal deflection voltage as shown in FIG. 7C is applied to the deflection element 22 of the cathode-ray tube 20, the image signal of FIG. 7B is repeatedly generated by the photo-electric converter 28 as shown in FIG. 7D. The image signal is applied to the sampler 13 which first samples the space signal $S_0$ with the clock pulses and applies the sampled space signal to the coder 14. The coder 14 then produces a binary code signal representing the sampled space signal $S_0$ ranging from time $T_1$ to time $T_7$. The coded signal is extracted from terminal E of position indicator 55 and transmitted through modulator 15 to a distant receiving end of the system. When the coder 14 completes transmission of the sampled space signal $S_0$, the coder 14 produces a proceed-to-next signal which is applied to the sampler 13 through terminal Z. The sampler 13 then proceeds to sample the subsequent mark signal $M_1$ and applies the sampled mark signal $M_1$ to the coder 14 which accordingly converts the sampled mark signal $M_1$ into a binary code signal appearing from $T_8$ to $T_9$ as shown in FIG. 7E. The sampler 13 and the coder 14 cooperates as above-mentioned to convert the image signal into successive binary code signals.

The successive binary code signals are then applied to the modulator 15 which first mixes the vertical synchronizing pulse signal as shown in FIGS. 8B and 8C and modulates the carrier signal from the carrier signal generator 12 with the code signals and the vertical synchronizing pulse signal as shown in FIG. 8D.

With refernce to FIGS. 9A through 9P, the operation of the sampler 13 will be explained in detail.

FIGS. 9A to 9D respectively show waveforms of the clock pulse signal, horizontal synchronizing pulse signal, blanking pulse signal and horizontal deflection voltage signal.

Since, at the outset, first and second binary counters 30 and 34 are empty, coincident circuit 33 produces a coincidence output which causes flip-flop 38 to go to 1 state and enables second AND gate 35 which thereby passes clock pulses over lead 34a to second binary counter 34. The counter 34, when filled with the input clock pulses, produces an overflow signal which energizes the vertical sync generator 36 to produce a vertical sync pulse which is applied through OR gate 41 to the set terminal of flip-flop 42. The AND gate 31 is thus enabled to pass clock pulses to binary counter 30. Simultaneously, the vertical sync pulse is applied to the clear terminal of binary counter 34 to clear the stored bits, and the overflow signal causes the flip-flop 38 to go to 0 state and disables the AND gate 35 to inhibit clock pulses. At this moment, the binary counters 30 and 34 are empty causing the coincident circuit to produce an output which causes flip-flop 38 to go to 1 state and enables AND gate 35. Therefore, the first and second counters 30 and 34 are loaded with the clock pulses supplied from terminals $h_1$ and $h_2$, respectively. While the clock pulses are fed into the counters 30 and 34, a coincidence ouput is generated which continues until the subsequent mark signal $M_1$ is detected by the mark-space read controller 39. When the mark-space read controller 39 detects the leading edge of the mark signal $M_1$ the controller 39 produces a stop pulse which is applied through the second OR gate 37 to the rest terminal of the first flip-flop circuit 38. The flip-flop circuit 38 then produces a logic 0 signal which prevents the second AND gate 35 from passing therethrough the clock pulses. Coincidence output thus terminates at the trailing edge of the space signal $S_o$. While the coincidence output is present, AND gate 35 is enabled to apply clock pulses to the one-bit eliminator 50 in which one bit is subtracted from the series of input pulses which represent the decimal number of run length $S_o$. The binary counter 51 accepts the one-bit eliminated train of pulses and counts them in accordance with the binary number system so that the run length is encoded into binary form to represent lower bits. At the instant the coincidence output terminates, flip-flop 38 changes its state from the 1 to 0 states (FIG. 9L) to thereby cause write pulse generator 56 to produce a transfer instruction signal (FIG. 9P) which is applied to shift register 53 so that stored lower bits in the counter 51 are transferred to shift register 53 in which higher bits of $0_s$ are formed. These higher and lower bits are shifted at a rate of 1 kHz to the right in the register by shift pulses supplied from shift pulse generator 57. As these pulses are shifted they are extracted from a first bit position specified by the position indicator 55 as will be described later and transmitted therethrough to the modulator 15 and to the receiving end of the system at a rate of 1 kHz. As will be described later, when the rightmost bit of the lower bits is shifted to a second bit position specified by the position indicator 55 (at time interval $T_7$, see FIG. 7E), the position indicator 55 applies to its terminal Z a proceed-to-next signal which clears the counter 30 to proceed with the next run length while the bits representing run length $S_o$ remains stored in the counter 34 and causes flip-flop 42 which has been reset by one of horizontal sync pulses to go to 1 state. It is to be noted that the binary counter 34 accumulates the clock pulses applied thereto until its rightmost bit position is filled when the last run length is detected, while counter 30 updates its contents at the occurrence of each run length. Clock pulses are thus supplied again to the binary counter 30. The original copy is repeatedly scanned along the same line path while run length $S_o$ is being transmitted on a bit by bit basis at a rate of 1 kHz during time intervals $T_1$ to $T_7$. When the rightmost bit of the clock pulses supplied to the counter 30 reaches a bit position which corresponds to the rightmost bit of run length $S_o$ now stored in the counter 34, coincidence output is again produced which sets the flip-flop 38 to enable AND gate 35 and instructs the mark-space controller 39 over lead 39a that mark signal $M_1$ is detected. At the trailing edge of the mark signal $M_1$, the controller 39 produces a control signal in manner similar to that described above by detecting the transition of signal level and terminates the coincidence output. Thus, run length $M_1$ is sampled by the clock pulses which represent the decimal number of mark signal $M_1$, and cooled into a binary number and transmitted as previously described. These processes are repeated until "$n-1$"th run length (in this example, run length $M_4$) is detected in which $n$ represents the number of run lengths appearing in a given image signal. Upon the last run length ($S_4$) being detected, an overflow signal will be delivered from the counter 34 to energize the vertical sync generator 36, which produces a verticl sync pulse which clears the counter 34 through lead 36a and causes the copy 25 to be shifted to the next line path. The vertical sync pulse is further applied through lead 54a to the clear pulse generator 54 to clear the stored bits in the counter 51 representing the last run length $S_4$. Therefore, the last run length is not transmitted to the receiver station. The vertical sync pulse is also applied to the modulator 15 immediately following the ($n-1$)th run length. Therefore, it will be appreciated that each run length is encoded into binary pulses during a horizontal scanning period and each of the binary pulses is transmitted subsequently at the horizontal scanning rate.

With reference to FIG. 10, the operation of the coder 14 will be explained hereinbelow.

Assume that a given run length has a decimal number of 50, the number of pulses applied to the binary counter 51 is thus 49 which is encoded into binary form 110001 which forms the lower bits as referred to above. The bit number indicator 52 determines the rightmost bit position of the lower bits and indicates the number of bits stores in the binary counter 51. The position indicator 55 which is coupled to the bit number indicator 52 utilizes this bit number information to specify the first bit position from which the encoded signal is extracted from the shift register 53 for transmission and to specify the second bit position to produce a proceed-to-next signal when it is occupied with the rightmost bit of the lower bits. The first bit position is so specified as to constitute higher bits of $0_s$ in the shift register 53. In this example, the 12th bit position from the leftmost position is specified as the first bit position or signal extraction or output position to thereby form 5 bits of $0_s$ as the higher bits since the number of lower bits is 6 as previously described. As the higher and lower bits are shifted to the right, the position indicator 55 extracts the pulses from the 12th bit position and passes them in serial form to the modulator 15 by way of terminal E. The 17th bit position is indicated as the second bit position or proceed-to-next position. When the rightmost bit of the lower bits is shifted to the 17th bit position it is known that all bits except for the leftmost bit are transmitted and whereupon a proceed-to-next signal is produced to proceed with the encoding of the next run length. In general, let us denote $m$ be the number of lower bits, thus the number of higher bits is $m-1$, the code output bit position is located at the $2m$-th position from the leftmost position and the proceed-to-next position is located at the $(3m-1)$th position.

In FIG. 12, there is shown a receiver to the facsimile system according to the invention. The receiver comprises a demodulator 60 for demodulating binary code signals transmitted from the transmitter and applied to an input terminal 61. A clock pulse generator 62 produces a clock pulse signal which is applied to a divider 63. The divided pulse signal which has a higher frequency than that of the carrier signal of the transmitted input signal is applied as a sub-carrier signal to the demodulator 60 which then modulates the sub-carrier signal with the input signal and thereafter envelope-detects the modulated sub-carrier signal so as to demodulate the input signal. When the input signal has a waveform as shown in FIG. 13A, the demodulated input code signals have such waveforms as shown in FIG. 13B. A vertical synchronizing pulse separator 64 separates from the demodulated signal a vertical synchronizing pulse signal having such a waveform as shown in FIG. 13C. A timing pulse generator 65 produces a timing pulse signal having such a waveform as shown in FIG. 13D in accordance with the demodulated code signal from the demodulator 60. The vertical synchronizing pulse signal divides the successive binary code signals representing 1−H facsimile signals from one another. The demodulated successive binary code signals are applied to a higher 0 bit counter 66 which counts the number of 0 of the higher bits that is, $m-1$ where $m$ represents the number of lower bits, with the help of shift pulses supplied from the timing pulse generator 65 and applies a signal on the corresponding terminal to indicate the number of the lower bits to a coincident circuit 67. A shift register 68 is coupled to the demodulator 60 to accept the lower bits. Since the shift register 68 is of the conventional type which successively shifts one or more of the accepted 1 bits by shift pulses supplied from the timing pulse generator 65, the higher bits, which are all zero bits, produce no effect on the shift register 68. The lower bits, which start with a 1 bit, are shifted in the register 68 successively to the right by the shift pulses. Shift register 68 is further coupled to the coincident circuit 67 such that its $m$th bit position corresponds to the $(m-1)$th bit position of the counter 66 so that coincidence occurs in the coincident circuit 67 when the rightmost bit of a signal having $m$ lower bits reaches the $m$th bit position. The coincidence output or code division pulse thus occurs at the end of each encoded run length (FIG. 16A) and is applied to a gate pulse generator 69. The signal from the frequency divider 63 is, on the other hand, applied to a horizontal synchronizing and blanking pulse generator 70 which then produces a horizontal synchronizing pulse and a blanking pulse. The horizontal synchronizing pulse is applied to a horizontal deflection circuit 71 which repeatedly energizes a deflection element of a fibre optics cathode-ray tube, so that the cathode-ray tube 72 is capable of recording on a recording medium 73 positioned on the faceplate visual information when recovered image signal is applied to the intensity control element of the tube 72 through amplifier 74. The recording medium 73 is fed by a feeding means such as a pair of rollers which is actuated by a prime mover 75. The prime mover 75 is energized by a driver 76 which is energized with the vertical synchronizing pulse signal from the separator 64.

As will be described later, the gate pulse generator 69 produces a gate or enable pulse (FIG. 16M) in timed relation with the code division pulse and applies it to AND gate $G_1$ to allow clock pulses to be applied to a first binary counter 80. A second binary counter 81 is coupled to a second coincident circuit 82 to which the first binary counter 80 is also coupled. Initially, the first and second counters 80 and 81 are empty, the coincident circuit 82 produces a coincidence output which puts flip-flop 83 under set condition so that AND gate $G_2$ is enabled to pass clock pulses to the second counter 81 and through a one-bit eliminator 85 to a third binary counter 84. A first coincident circuit 86 is connected between the third counter 84 and shift register 68 to produce a coincidence output when the clock pulses supplied to the third counter 84 reaches a number which equals the decimal number of the run length minus one $(m-1)$ now stored in binary form in the shift register 68. The output from the coincident circuit 84 is applied through OR gate $G_3$ to the reset terminal of flip-flop 83 to thereby disable AND gate $G_2$. While the AND gate $G_2$ is enabled, the first and second binary counters 80 and 81 accept clock pulses and the second coincident circuit 82 continues to apply the coincidence output to flip-flop 83 until it is reset by the output from the first coincident circuit 86. The output of flip-flop 83 goes low and clears the third counter 84. The flip-flop 83 thus remains in its set condition during the interval when the third counter accepts clock pulses so that the binary number of the run length stored in shift register 68 is translated into a decimal number represented by the number of clock pulses stored in the third counter 84. Therefore, the signal from the output of flip-flop 83 represents the length of a white (space) or a black (mark) run. A J-K flip-flop 87 has its trigger terminal connected to the gate pulse generator controller 69 such that it changes its states at the leading edge of the gate pulses in order that AND gate $G_4$ is enabled alternately with occurrence of the gate pulses to reproduce a sequence of alternate white and black runs. If it is assumed that the first run length appearing at the start of each line scan be a white area (space) by starting each line scan at the marginal portion of the copy 25, the flip-flop 87 is initially in the 1 state and the occurrence of the first gate pulse causes flip-flop 87 to go from the 1 state to 0 state to disable the AND gate $G_4$ to produce a white run of the length determined by flip-flop 83. As will be described later, the gate pulse goes to the zero level upon the occurrence of a blanking pulse and causes the first counter 80 to be cleared upon the lowering of the potential at the clear terminal thereof. While the first counter 80 is made empty, the second counter 81 holds its stored bits until it will be cleared by a pulse generated from the gate pulse generator 69 using a vertical sync pulse to be described later. The occurrence of the next gate pulse causes AND gate $G_1$ to be enabled to pass clock pulses to the first counter 80. A coincidence output will be delivered from the second coincident circuit 82 when the same count is stored in the counter 80 as that stored in the counter 81. The output of flip-flop 83 goes high and enables AND $G_2$ to pass clock pulses to the counter 81 as well as the third counter 84 by way of one-bit eliminator 85. Upon occurrence of coincidence between the subsequent run length stored in shift register 68 and the bits stored in the third counter 84, the flip-flop 83 is reset resulting in a signal at the output thereof representing the subsequent run length which is passed through AND gate $G_4$ which in turn is enabled by flip-flop 87, thereby resulting in a block run. These processes will be repeated until the $(n-1)$th length is reproduced. Since the last run length is not transmitted and the vertical synchronizing pulse appears immediately following the $(n-1)$th run length, the receiver station must be capable of reconstituting the last run length during a portion of the interval of the vertical synchronizing pulse.

FIG. 15 shows in detail the gate pulse generator and controller 69 of the receiver of FIG. 12. The generator and controller 60 includes a first monostable multivibrator 100 having an input terminal connected to the output terminal of the coincident circuit 67. An output terminal of the first monostable multivibrator 100 is connected to a set terminal of a third flip-flop circuit 101 and to one input of a fourth AND gate 102. The Q output terminal of the flip-flop circuit 101 is connected to an input terminal of a second monostable multivibrator 103 which has an output terminal connected to one input of a fifth AND gate 104. The horizontal synchronizing pulse output terminal of the horizontal synchronizing pulse generator and blanking pulse generator 70 is connected to the other input of the fourth AND gate 102 and the other input of the fifth AND gate 104. The output terminal of the vertical synchronizing pulse generator 64 is connected to an input terminal of a third monostable multivibrator 105 which has an output terminal connected to one input of a sixth AND gate 106. The other input of the sixth AND gate 106 is connected to the horizontal synchronizing pulse terminal. An output of the sixth AND gate 106 is connected to one input of a second OR gate 107 the other input of which is connected to an output of the fifth AND gate 104. An output of the second OR gate 107 is connected to an input terminal of a fourth monostable multivibrator 108. An output terminal of the fourth monostable multivibrator 108 is connected to one input of a seventh AND gate 109 the other input of which is connected to the blanking pulse terminal of the generator 70 and to an input of a first inverter 110. An output of the first inverter 110 is connected to the reset terminal of a fourth flip-flop 112. An output terminal 113 of the fourth flip-flop circuit 112 serves as the output terminal of the gate pulse. The output terminal of the vertical synchronizing pulse separator 64 is further connected to an input terminal of a fifth monostable multivibrator 114 and to one input of a eighth AND gate 115. An output terminal of the fourth monostable multivibrator 114 is connected to the other input of the eighth AND gate 115 and to the reset terminal of flip-flop 83 through OR gate $G_3$ and to the output terminal of the first coincident circuit 86.

Figure 16:
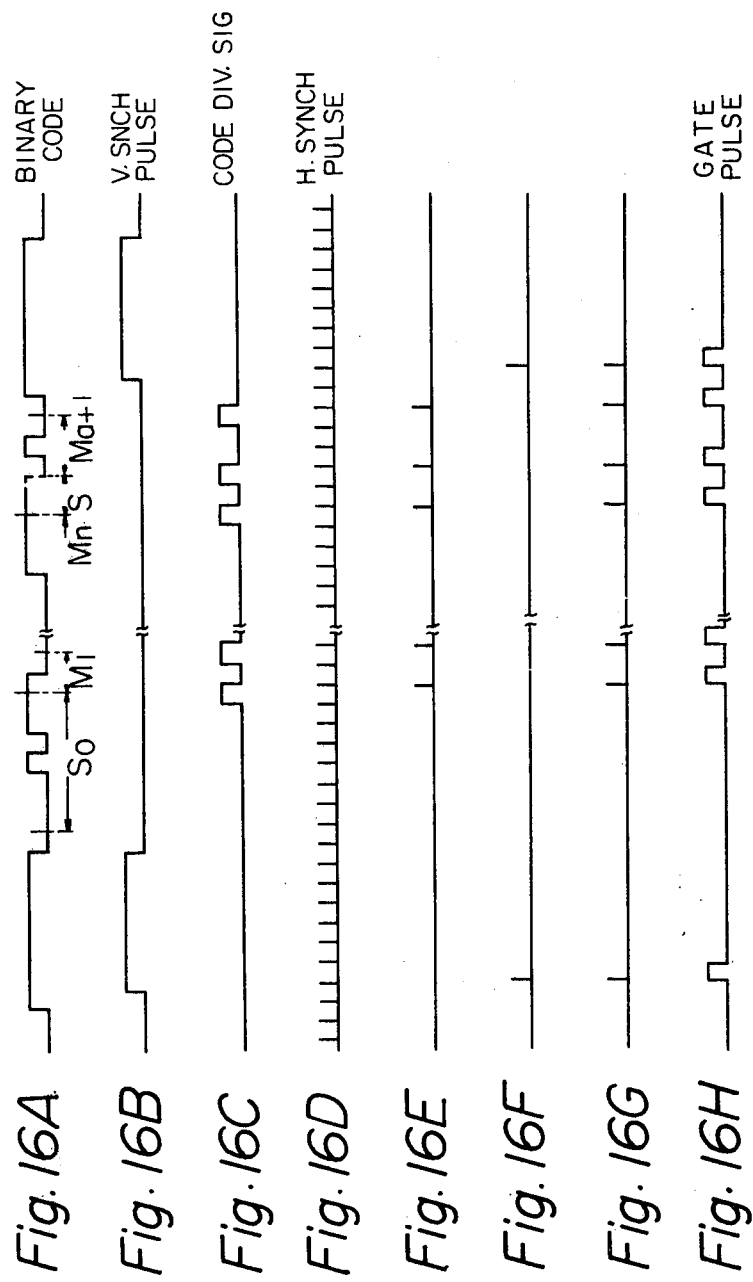

With reference to FIG. 16, the operation of the gate, pulse generator and controller 69 is explained hereinbelow.

Since each of the encoded signals has a signal length which is a multiple of the interval of horizontal synchronizing pulses, the code division pulses occur at a fixed time relation with the horizontal synchronizing pulses as shown in FIGS. 16A and 16B. The occurrence of a code division pulse causes the monostable multivibrator 100 to produce a spike which in turn causes the third flip-flop 101 to produce a negative going pulse at the Q output which returns to zero by a horizontal sync pulse (FIG. 16E). At the trailing edge of the pulse, 2nd monostable multivibrator 103 produces a positive going pulse having a predetermined duration greater than the pulse length of the horizontal sync pulse so as to enable the fifth AND gate to allow those horizontal sync pulses which closely follow the code division pulses (FIG. 16G). The fourth monostable multivibrator (MM) 108 is triggered by the enabled sync pulses to produce pulses of a predetermined duration. The seventh AND is enabled by the pulses produced by the fourth MM and the inverted blanking pulses to cause the fourth flip-flop 112 to go from the zero to 1 state. The output of the flip-flop 112 serves as the gate pulse (FIG. 16M) to enable the first binary counter 80 to supply clock pulses through its trigger terminal as previously described. The flip-flop 112 returns to the zero state at the leading edge of a blanking pulse to define a time interval within which clock pulses are supplied to the binary counter 80 in synchronism with a code division pulse.

With the arrival of a vertical synchronizing pulse which occurs immediately after the occurrence of the (n-1)th run length, the third MM 105 will be energized to produce a pulse having a pulse length longer than the interval of two horizontal sync pulses so that a horizontal sync pulse which closely follows the rising edge of the vertical sync pulse may be obtained through the sixth AND gate 106 (FIG. 16I). The fourth MM is triggered by the extracted horizontal pulse so that an extra gate pulse is produced to reconstruct the last run length. The fifth MM is triggered to produce a pulse having a length substantially equal to or longer than the interval of two enable pulses (FIG. 16N) to enable the eighth AND gate 115 at the falling edge thereof so that the driver 76 is not actuated until the last run length is reproduced (FIG. 16P). Therefore, it is to be understood that the last run length is reconstructed during a portion of the vertical sync pulse.

It follows from the foregoing that if an image signal of a given line path contains a single run length, an overflow signal will be produced at the end of a first line scan along that line path and a vertical sync pulse will result immediately following the previous vertical sync pulse (see FIG. 4C) and thus no visual information is transmitted to the receiver station. The occurrence of successive vertical sync pulses will cause the driver 76 of the receiver to sequentially transport the recording medium 73, and thus transmission time can be greatly reduced.

It will be understood that the invention is not to be limited to the exact construction shown and described and that various changes and modifications may be made without departing from the spirit and scope of the invention, as defined in the appended claim.

What is claimed is:
1. In a facsimile communication system for transmitting signals representative of the light levels of a two-valued object, comprising, at a transmitter station, line scanning means, means for causing said scanning means to repeatedly scan each of a plurality of line paths in said object at a predetermined rate, means for developing an image signal related to the light levels of each of said line paths, means for generating, during a portion of an individual scan of a single line path, a run length representative of a portion of said image signal, means for generating a vertical synchronization pulse, means for encoding said run length into a series of binary coded pulses, means for transmitting each said coded pulses at said predetermined rate and said vertical synchronization pulse to a receiver station, and vertical deflecting means for sequentially shifting said line paths and, at said receiver station, means for decoding said binary coded pulses to recover said run length, means operable with said recovered run length to determine one of two discrete signal levels related to said light levels, line scanning means, means for causing said line scanning means to repeatedly scan each of a plurality of line paths to successively reproduce said portion of said image signal at said predetermined rate, and vertical deflecting means actuated by said vertical synchronization pulse for sequentially shifting said line paths, the improvement wherein said vertical synchronization pulse is generated at said transmitter station at the instant the binary coded pulses representative of (n-1)th run length have been transmitted wherein "n" represents the maximum number of run lengths within said image signal, and means is provided at said receiver station to delay the actuation of said vertical deflecting means for a period sufficient to reconstruct nth run length.

2. A facsimile communication system for transmitting signals representative of the light levels of a two-valved object, comprising, at a transmitter station, line scanning means, means for causing said scanning means to repeatedly scan each of a plurality of line paths in said object at a predetermined rate, means for developing an image signal related to the light levels of each of said line paths, means for generating, during a portion of an individual scan of a single line path, a run length representative of a portion of said image signal, means for encoding said run length into a series of binary coded pulses, means for transmitting said coded pulses at said predetermined rate to a receiver station, storage means for accumulatively storing a series of run lengths, means associated with said storage means for generating a vertical synchronization pulse when said storage means becomes stuffed with said run lengths to its capacity and transmitting said synchronization pulse to said receiver station, vertical deflecting means for sequentially shifting said line paths, and at said receiver station, code-end detecting means for detecting the end of each series of said binary coded pulses, means for decoding said coded pulses to recover said run lengths, means operable with said code-end detecting means to alternately determine one of two discrete signal levels related to said light levels, storage means operable with said code-end detecting means and said decoding means for accumulatively storing said recovered run lengths, said code-end detecting means being responsive to said vertical synchronization pulse to cause said storage means to be actuated whereby the last run length is stored therein, line scanning means, means for causing said line scanning means to repeatedly scan each of a plurality of line paths to successively reproduce said recovered run length at said predetermined rate, vertical deflecting means for sequentially shifting said line paths, and means responsive to said vertical synchronization pulse for delaying the actuation of said vertical deflecting means for a period sufficient to reproduce said last run length.

3. A facsimile transmitter for transmitting signals representative of the light levels of a two-valued object, comprising:
- line scan and signal developing means for scanning each of a plurality of line paths in said object at a first rate and developing an image signal related to the light levels of each of said line paths;
- means for generating clock pulses at a second rate higher than said first rate;
- first and second storage means arranged to store and clock pulses in serial form;
- a coincident circuit connected to said first and second storage means to produce an output when coincidence occurs between the stored bits in said first and second storage means;
- means operable with said signal developing means for detecting the occurrence of a predetermined signal level;
- means connected to said coincident circuit to supply said first storage means with said clock pulses and further connected to said first storage means and to said detecting means to cease the supply of said clock pulses to said first storage means;
- means for supplying said second storage means with said clock pulses;
- means for sampling said run length with said clock pulses;
- means for converting said sampled run length into a series of binary coded pulses;
- means for transmitting said binary coded pulses at said first rate;
- means for indicating the end of transmission of said series of coded pulses to clear the stored bits in said second storage means and at the same time to resupply the same with said clock pulses; and
- means coupled to said first storage means for generating a vertical synchronization pulse when said first storage means is filled with said clock pulses to its capacity.

4. A facsimile receiver adapted to receive a series of binary codes each representing the run length of a signal in one of two discrete levels related to the light levels of a two-valued object and a vertical synchronization pulse occurring at the end of said series, comprising, code-end detecting means for detecting the end of each of said codes, means for decoding said code to recover said run length, means operable with said code-end detecting means and said decoding means for accumulatively storing said recovered run length, said code-end detecting means being responsive to said vertical synchronization pulse to cause and storage means to be actuated whereby the last run length is stored therein, line scanning means, means for causing said line scanning means to successively reproduce said recovered run length at a predetermined rate, vertical deflecting means for sequentially shifting said line paths, and means responsive to said vertical synchronization pulse for delaying the actuation of said vertical deflecting means for a period sufficient to reproduce said last run length.

5. A facsimile receiver adapted to receive a series of binary codes each representing the run length of a signal in one of two discrete levels related to the light levels of a two-valued object and a vertical synchronization pulse, comprising:
- code-end detecting means for detecting the end of each of said binary codes and including a shift register for storing said each of binary codes;
- means for generating clock pulses;
- a binary counter arranged to store said clock pulses;
- a first coincident circuit coupled between said shift register and said binary counter to produce an output when coincidence occurs between the stored bits in said shift register and said binary counter, whereby said run length is recovered;
- means operable with said code-end detecting means to determine one of two discrete signal levels related to said light levels;
- first and second storage means arranged to store said clock pulses in serial form;
- a second coincident circuit connected between said first and second storage means to produce an output when coincidence occurs between the stored bits in said first and second storage means;
- means connected to said second coincident circuit to supply said first storage means with said clock pulses and further connected to said first coincident circuit to cease the supply of said clock pulses to said first storage means;
- means operable with said code-end detecting means for generating a clock enable pulse to supply said second storage means with said clock pulses;
- said second storage means being arranged to clear the bits stored therein when said run length is recovered;
- line scan and image reproducing means for scanning along a line path within image reproducible means for reproducing said recovered run length on said reproducible means;
- vertical deflecting means for sequentially shifting said line path; and
- means responsive to said vertical synchronization pulse to delay the actuation of said vertical deflecting means for a period equal at least to the duration of two clock enable pulses;
- said first storage means being associated with said delay means to clear the bits stored therein.

6. A method of transmitting and receiving signals representative of the light levels of a two-valued object, comprising:

repeatedly scanning each of a plurality of line paths in said object at a predetermined rate;

developing an image signal related to the light levels of each of said line paths;

detecting the occurrence of a predetermined signal level related to one of said light levels;

generating a run length representative of a portion of said image signal;

encoding said run length into binary coded pulses;

transmitting said coded pulses at said predetermined rate to a receiver station;

producing and transmitting a vertical synchronization pulse when ($n$-1)th run length has been transmitted, wherein $n$ represents the maximum number of run lengths within said image signal;

shifting said line path to the next when said vertical synchronization pulse is produced;

decoding, at said receiver station, said binary coded pulses to recover said run length;

determining alternately one of two discrete signal levels related to said light levels;

successively reproducing said recovered run length in accordance with said signal levels along a line path;

reconstructing $n$th run length during the interval of said vertical synchronization pulse; and shifting said line path to the next when said $n$th run length is reconstructed.

7. A facsimile communication system comprising, at a transmitter station:

means for scanning information on a printed document repeatedly along each of a plurality of line paths within the document to generate a series of binary signal waveforms;

means for detecting, during given ones of said line scans, a respective binary signal within that one of said waveforms generated during that line scan;

means for coding the length of each detected binary signal into a series of respective binary digits;

means for transmitting the series of binary digits to a receiver station in synchronism with the line scans; and means for disabling said means for coding during a period taken to transmit and respective binary digits, except for the last one of the respective binary digits and for disabling said coding means upon detection of the last binary signal of a respective one of said waveforms; and, at the receiver station, comprising:

means for successively decoding the transmitted series of binary digits to recover the original binary signals except for said last binary signal;

means for generating clock pulses at regular intervals; a counter having a predetermined maximum count for counting said clock pulses in response to said recovered binary signals; and means for detecting the difference between the number of the counted clock pulses and said predetermined maximum count to reproduce said last binary signal.

8. A method of reducing transmission time comprising the step of, at a transmitter station:

scanning information on a printed document repeatedly along each of a plurality of line paths within the document to generate a series of binary signal waveforms;

detecting during given ones of said line scans, a respective binary signal within the waveform generated during that line scan;

coding the length of each detected binary signal into a series of binary digits;

transmitting said series of binary digits to a receiver station in synchronism with the line scan while disabling the coding of the next binary signal during a period taken to transmit the respective binary digits except for the last one of the respective binary digits;

disabling the step of coding upon detection of the last binary signal of a respective waveform; and at the receiver station, the steps of:

successively decoding the transmitted series of binary digits to recover the original binary signals except for the last binary signal;

measuring length of said recovered binary signals and subtracting the measured length from a predetermined length to reproduce said last binary signal.

* * * * *